US008545028B2

(12) United States Patent
Fischer

(10) Patent No.: US 8,545,028 B2
(45) Date of Patent: Oct. 1, 2013

(54) PROJECTOR SYSTEM FOR ANIMATION OF IMAGE CELLS

(75) Inventor: Troy Fischer, New York, NY (US)

(73) Assignee: Fishco Innovation LLC, Brooklyn, NY (US)

( * ) Notice: Subject to any disclaimer, the term of this patent is extended or adjusted under 35 U.S.C. 154(b) by 663 days.

(21) Appl. No.: 12/622,741

(22) Filed: Nov. 20, 2009

(65) Prior Publication Data
US 2011/0122368 A1 May 26, 2011

(51) Int. Cl.
G03B 21/64 (2006.01)
G03B 23/08 (2006.01)

(52) U.S. Cl.
USPC ............... 353/94; 353/81; 353/108; 353/38; 352/87; 362/249.02

(58) Field of Classification Search
USPC ............. 353/94, 43, 107, 109, 110, 1, 38, 353/120; 352/87; 359/616, 639; 40/433, 40/431, 442; 362/227, 232, 249.02, 249.05
See application file for complete search history.

(56) References Cited

U.S. PATENT DOCUMENTS

| | | | |
|---|---|---|---|
| 2,445,651 A | 7/1948 | Weavie et al. | |
| 3,472,586 A | 10/1969 | Zuili et al. | |
| 3,573,785 A | 4/1971 | Miller et al. | |
| 3,973,840 A | 8/1976 | Jacobs et al. | |
| 4,104,625 A | 8/1978 | Bristow et al. | |
| 4,756,614 A | 7/1988 | Kato et al. | |
| 5,300,966 A | 4/1994 | Uehira et al. | |
| 5,426,460 A | 6/1995 | Erving et al. | |
| 5,450,148 A * | 9/1995 | Shu et al. | 353/42 |
| 5,541,680 A | 7/1996 | Fromm | |
| 5,847,748 A | 12/1998 | Laughlin | |
| 5,902,030 A | 5/1999 | Blanchard | |
| 6,443,590 B1 | 9/2002 | Lovitt et al. | |
| 6,481,849 B2 | 11/2002 | Martin et al. | |
| 6,513,938 B2 | 2/2003 | Kubota et al. | |
| 7,273,280 B2 | 9/2007 | Smoot et al. | |
| 7,329,035 B2 | 2/2008 | Feliciano et al. | |
| 7,396,136 B2 | 7/2008 | Kim et al. | |
| 7,857,454 B2 | 12/2010 | Mastrosimone-Gese et al. | |
| 8,100,540 B2 * | 1/2012 | Huebner | 353/94 |
| 2003/0133080 A1 | 7/2003 | Ogawa et al. | |
| 2004/0183901 A1 | 9/2004 | Belliveau | |
| 2007/0183152 A1* | 8/2007 | Hauck et al. | 362/251 |
| 2007/0195294 A1 | 8/2007 | Willey et al. | |
| 2008/0129963 A1 | 6/2008 | Hohl | |
| 2008/0143966 A1* | 6/2008 | Mastrosimone-Gese et al. | 353/15 |

OTHER PUBLICATIONS

International Search Report, dated Jan. 14, 2011 (12 pages).
Link to video posted on internet that appears to be of a toy called "Elekit": http://www.youtube.com/watch?v=mHvhd-nyXeY.

(Continued)

Primary Examiner — William C Dowling
(74) Attorney, Agent, or Firm — Day Pitney LLP

(57) ABSTRACT

An image animation system having a plurality of individual image projectors focused onto a single focal area on a projection surface or medium. Angled optics, or a prism, may be used to direct the projections onto the single focal area. Individual still images are projected in a sequence to create a projected motion animation.

4 Claims, 11 Drawing Sheets

(56) References Cited

OTHER PUBLICATIONS

Link to internet website containing description and video of product called "Elekit": http://www.japantrendshop.com/led-animation-box-p-677.html.

Link to internet website containing description and video of product called "Uchiage Hanabi": http://www.japantrendshop.com/uchiage-hanabi-fireworks-projector-p-577.html.

Link to video posted on internet that appears to be of toys sold in Japan, including "Home Fireworks Projector": http://us.cnn.com/video/?/video/living/2009/12/16/lah.japan.wacky.gifts.cnn.

Link to internet website containing description of product called "Sega Indoor Fireworks Projector": http://www.firebox.com/product/2541/Sega-Indoor-Fireworks-Projector.

Link to video posted on internet of product called "Sega Indoor Fireworks Projector": http://www.firebox.com/video/2491.

\* cited by examiner

FIG 6
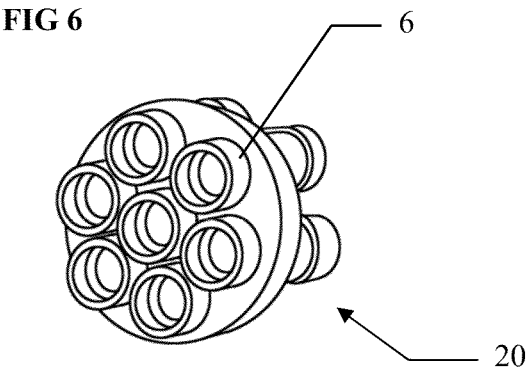
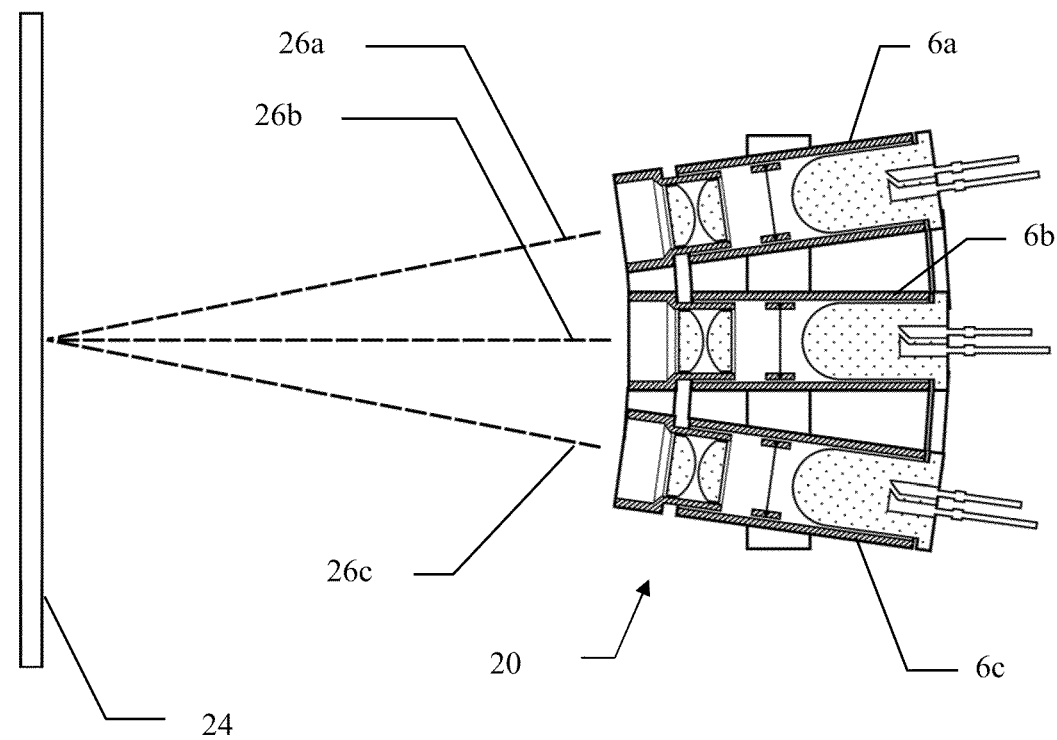
FIG 7

FIG 8
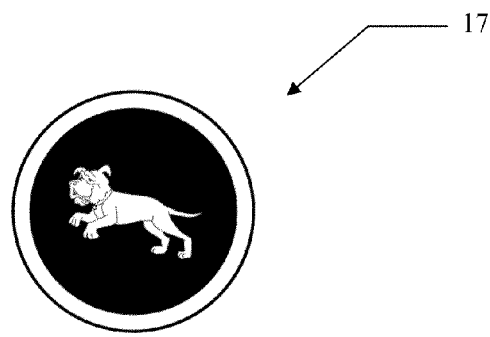
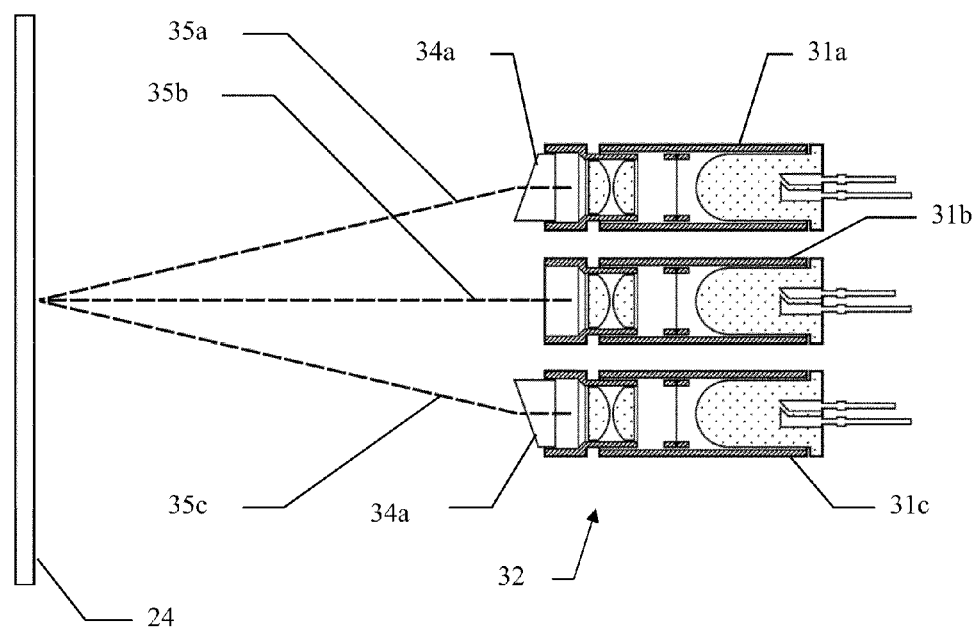
FIG 9

FIG 10
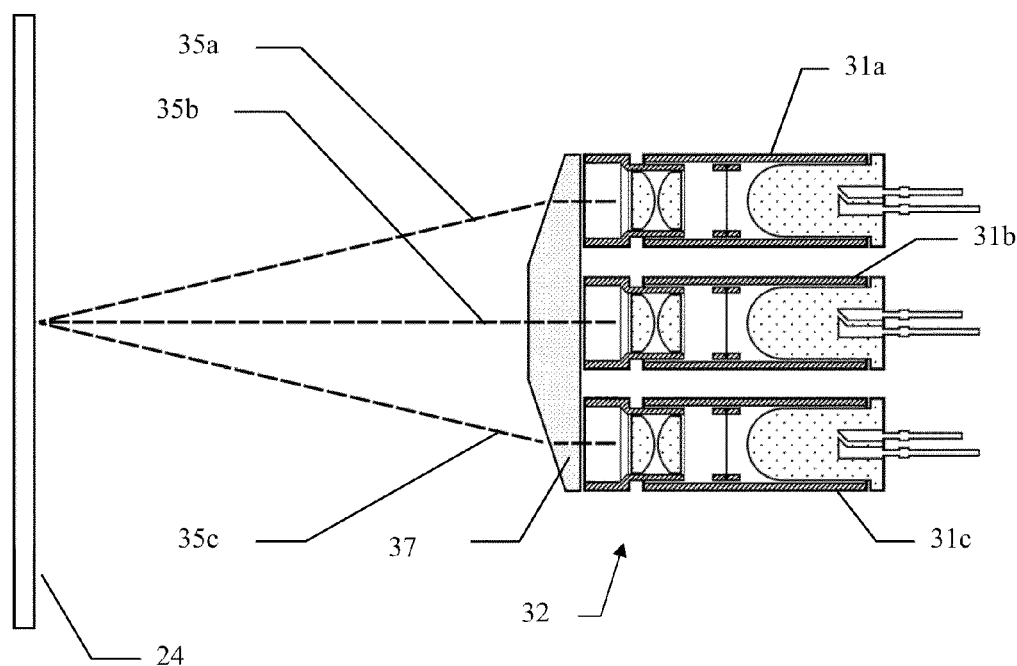
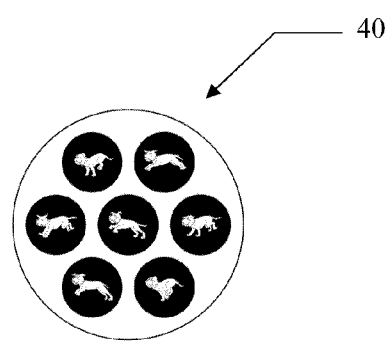
FIG 11

FIG 12c
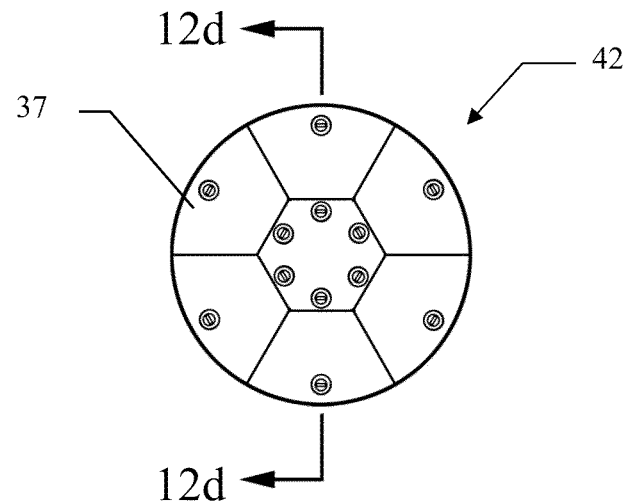
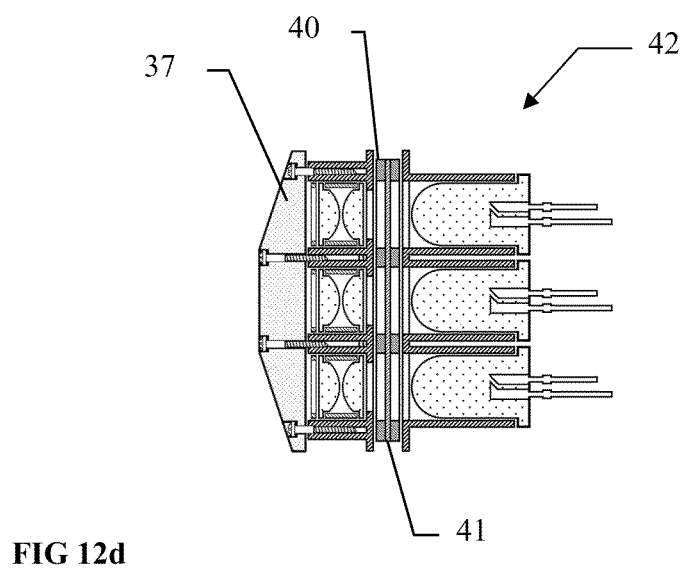
FIG 12d

FIG 15
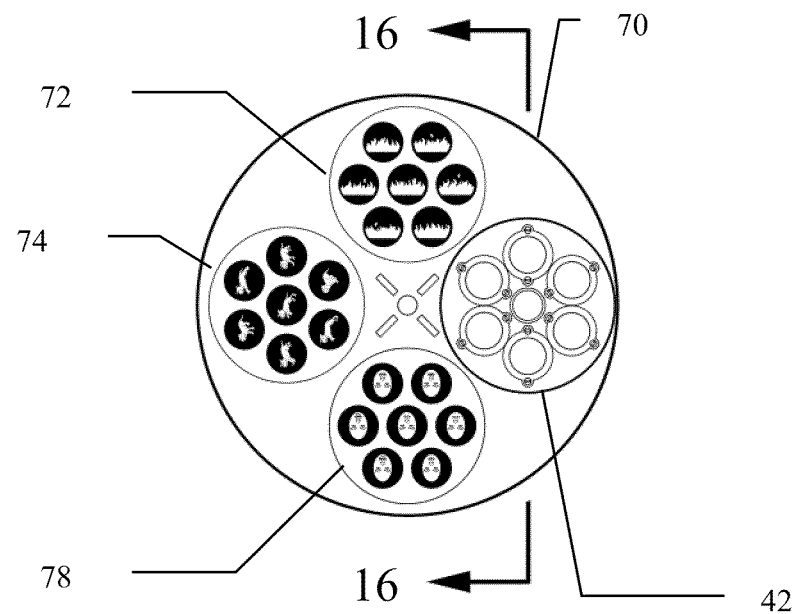
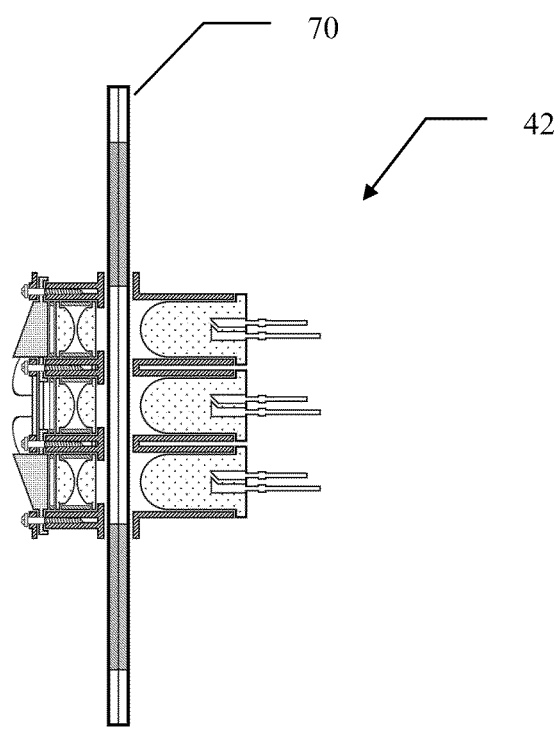
FIG 16

PROJECTOR SYSTEM FOR ANIMATION OF IMAGE CELLS

The present invention relates to animation system displays with a minimum of moving parts. More particularly, this invention provides for a plurality of individual slide projectors that project light through individual slides sequentially onto a surface or medium to produce an animation of a moving image. The resultant animation may be used in numerous applications, such as, animated nightlights, animated facial features inside toy figures, baby crib image projector, or in a toy vehicle that flashes images by rolling forward or backward.

BACKGROUND

Devices that project moving images have typically required the use of motors to move a film or image wheel. Those systems have tended to be noisy, bulky in design, and costly to produce due to the many moving parts required.

The power required for such motorized systems to operate has also limited performance in many battery-operated applications. For many applications, devices have used LCD screens, LCD projectors, and other electronic displays, which were often very costly.

Such prior art systems do not teach or suggest the use of individual light sources and whole-image projecting lens systems in an image animation display. Exemplary prior art systems include those discussed in the following patents and published patent applications.

U.S. Pat. No. 3,573,785 (Miller) discloses a stroboscopic display in which images are placed on the face of a drum and selectively illuminated by lamps.

U.S. Pat. No. 3,973,840 (Jacobs et al.) discloses a mannequin that simulates speech by rear projecting footage of a talking human face onto the inner surface of the mannequin's face.

U.S. Pat. No. 5,300,966 (Uehira et al.) discloses the use of a combination of liquid crystal light valves and mirrors in order to compose light beams as image parts into a composite moving image.

U.S. Pat. No. 4,104,625 (Bristow et al.) discloses using a plurality of cell units which each have a film negative which may include a full or partial image and, by illuminating cell units in a particular order, animated movement of facial features can be simulated. The device uses a flash tube to illuminate the cells, but use of a shutter, both mechanical and electrical, is disclosed.

U.S. Pat. No. 5,426,460 (Erving et al.) discloses an method of animating a facial image. The lips of a still image are replaced by an idealized image, which is synched to a voice transmission.

U.S. Pat. No. 5,902,030 (Blanchard) discloses a projection display system that uses two off-axis projectors that project onto a curved surface in order to seamlessly compose the two projected images into a whole image.

U.S. Patent Publication No. 2003/0133080 (Ogawa et al.) discloses the use of LED-illumination in a digital micromirror device projector. Multiple fly-eye lenses are utilized, one for each of the primary colors.

U.S. Pat. No. 6,481,849 (Martin et al.) teaches the use of multiple image sources, which "display sequential images of an object in a time-multiplexed manner". The multiple image sources are projected adjacent one another and a diffuser is used to "smear" the seams between adjacent views.

U.S. Pat. No. 6,513,938 (Kubota et al.) discloses a multidisplay device that uses a plurality of projectors that each project a distinct portion of an image.

U.S. Pat. No. 7,273,280 (Smoot et al.) teaches the use of multiple projectors which present background and foreground images "on demand" as the projector responds to electrical signal input from the user.

U.S. Pat. No. 7,396,136 (Kim et al.) discloses an illumination unit to replace high-pressure mercury lamps which employs a plurality of LED's in modules which can sequentially emit red, green and blue columns of light.

U.S. Patent Publication No. 2008/0129963 (Hotel) discloses an image animation apparatus that uses a rotating motor driven image drum for selected strobing of animation frames.

Such prior systems have been mechanically and electronically complex. As a result, they do not provide low cost, compact and reliable moving image display systems that can be used in, for example, toys, novelties, night lights.

SUMMARY OF THE INVENTION

The present invention relates to an image animation system having a plurality of individual image projectors focused onto a single area of a projection surface or medium. The invention utilizes multiple light sources, that each may illuminate individual still images in an electrically or mechanically dictated sequence to create an animation. Low-energy light sources, such as LEDs, may be used as the light source for the animation. Further, the image sequence may be linked to a sound card and a speaker so that sound can be integrated with the animation.

In one embodiment, individual projectors may each be angled towards a focal area on a projection medium. In other embodiments, angled optics, or prisms, may be used to direct the light from the projectors towards the focal area on the projection medium.

The projector system may be implemented in an embodiment where individual projectors, each contain a single image frame. Alternatively, a single slide containing a plurality of images may be used. Further, a master slide transparency wheel containing multiple sets of animations can allow for manipulation among sets of images.

The present invention has many potential applications including use in, for example, front or reverse projection screens for toys, animated nightlights, animated background for any environment, animated face inside toy figures, baby crib image projector, or in a toy vehicle that flashes images by rolling forward or backward.

BRIEF DESCRIPTION OF DRAWINGS

FIG. 6 depicts an isometric drawing of an embodiment of the present invention.

FIG. 7 depicts a block diagram illustrating light paths of an embodiment of the present invention.

FIG. 8 depicts a single image transparency according to an embodiment of the present invention.

FIG. 9 depicts a block diagram illustrating light paths of an embodiment of the present invention using angled prisms.

FIG. 10 depicts a block diagram illustrating light paths of an embodiment of the present invention using an integrated prism.

FIG. 11 depicts an integrated transparency holder according to an embodiment of the present invention.

FIG. 12b depicts a cross section of an embodiment of the present invention depicted in FIG. 12a.

FIG. 12c depicts a top view of an embodiment of the present invention showing an integrated projection system containing an integrated prism.

FIG. 12d depicts a cross section of an embodiment of the present invention depicted in FIG. 12c.

FIG. 15 depicts an alternative view of the embodiment of the present invention showing the master slide transparency wheel.

FIG. 16 depicts a side view of an embodiment of present invention showing the master slide transparency wheel.

DETAILED DESCRIPTION OF EXEMPLARY EMBODIMENTS

Figure 1:
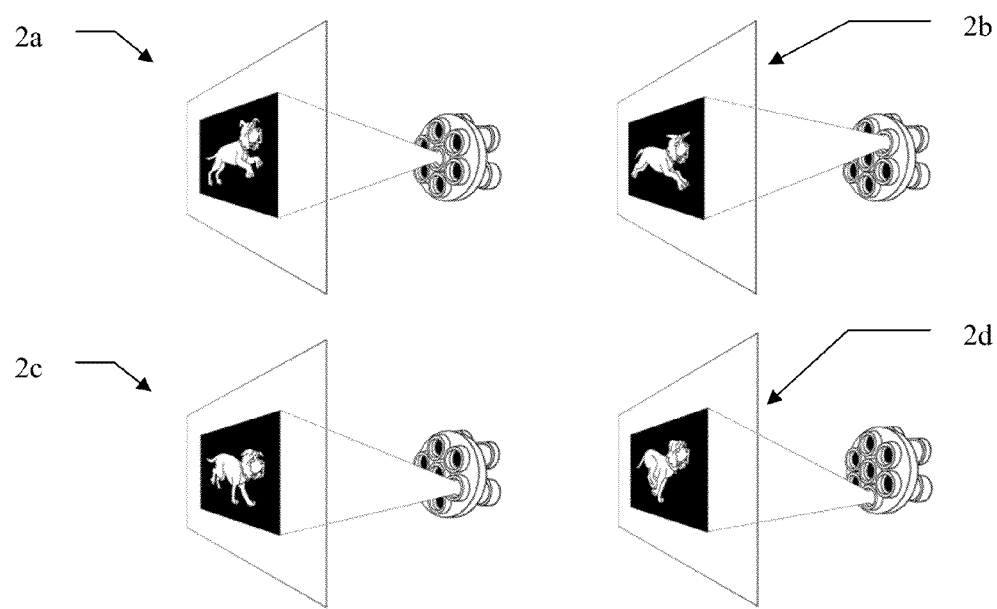
FIG. 1 illustrates the projection of individual frames using an embodiment of a projection system according to the present invention.

FIG. 1 illustrates a sequence of images projected onto a surface (2a, 2b, 2c, 2d) according to an embodiment of the present invention. The particular exemplary embodiment illustrates four projected images that, when displayed in sequence, results in the animation of a dog running.

Figure 2:
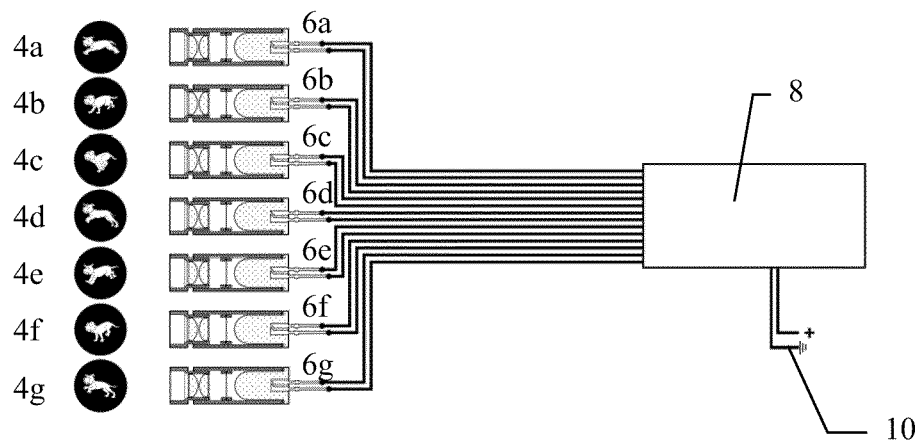
FIG. 2 depicts a block diagram of an embodiment of the present invention employing a microprocessor.

A block diagram of one embodiment of the present invention is shown in FIG. 2, illustrating how the basic animation sequence can be achieved. Light source outputs 6a-6g display projected frames 4a-4g, respectively. The microprocessor 8, dictates the sequence upon which the light source outputs 6a-6g are enabled to display the output projected frames 4a-4g. To achieve an animation, only of one light source outputs 6a-6g is enabled at a time. To achieve an animation sequence, the microprocessor may enable the sequencing of animations in order from 4a through 4g. The microprocessor may run on a continuous loop in sequence (e.g, 4a, 4b, 4c, 4d, 4f, 4g) to show, for example, a character running, or oscillate in a back and forth sequence (e.g., 4a, 4b, 4c, 4d, 4c, 4b, 4a) to show, for example, a character jumping up and down. The microprocessor 8 may be, for example, a commodity 8-bit microcontroller, such as a MicroChip Pic 18F252 or an Ubicom SX-28a. The system may be powered by a DC power source 10.

Figure 3:
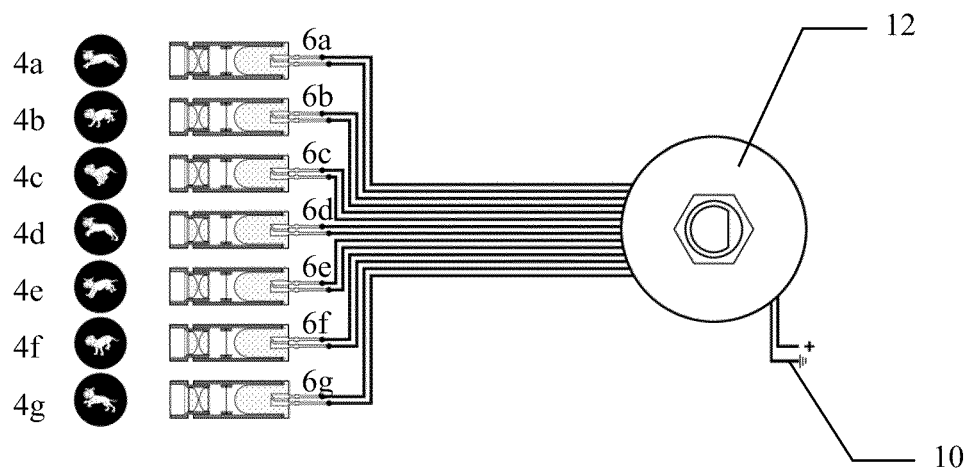
FIG. 3 depicts a block diagram of an embodiment of the present invention employing a rotary switch.

FIG. 3 illustrates an embodiment illustrating that, instead of a microprocessor, a manual switch, such as a rotary switch 12, may be used to cause the animation sequence. The rotary switch 12 provides for manual switching among light source outputs 6a-6g that produce projected frame 4a-4g. The rotary switch 12, may have a plurality of contacts. When it is turned, the switch may make contact with one LED or light source at a time. When turned continually, each revolution of the switch actuator completes a cycle. The light source can be wired to power the LEDs in a predetermined sequence to create the desired animation. The frames can be looped in sequence or oscillate in a back and forth sequence depending on how the switch is wired to address the light sources. Such a system may be used in, for example, a toy vehicle. In that situation, rolling the car would provide the switching for the animation. The speed of the toy vehicle would dictate the speed of the animation, as the animation would be displayed more quickly based on the car moving more quickly, due to the mechanical nature of the switching.

Figure 4:
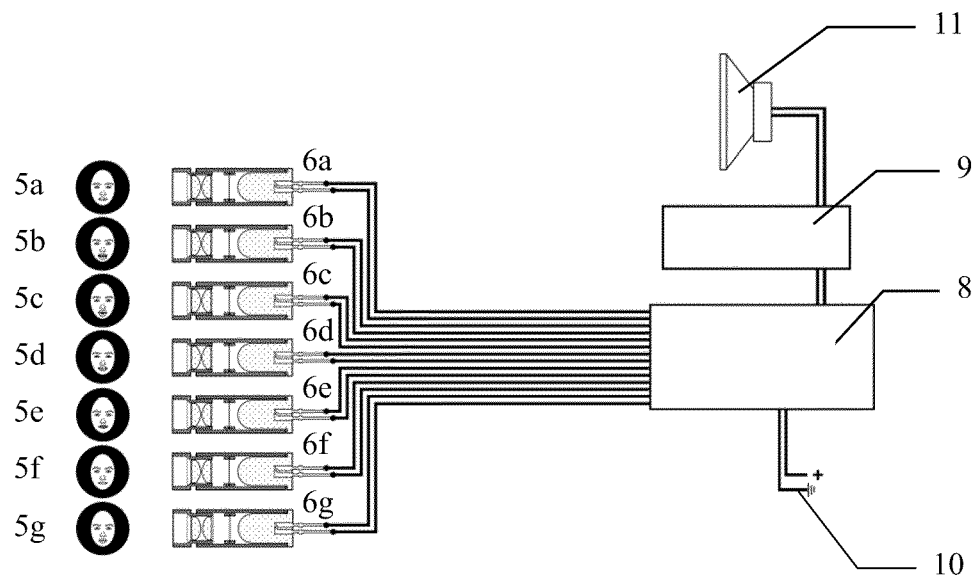
FIG. 4 depicts a block diagram of an embodiment of the present invention employing a sound card.

FIG. 4 depicts an embodiment showing that sound can be linked to the animation. The microprocessor 8 is connected to sound chip 9 and output speaker 11. The sound chip 9 may be, for example, a commodity embedded digital audio sample playback system, such as a WinBond ISD-2560. In this embodiment, facial animation projected frames 5a-5g or visual visemes, for example, may be used. Each viseme slide image projected by its light source may correspond to a vocal sound or phoneme. When a phrase is activated by the user, the series of phonemes that are produced through speech are timed to be heard at the same time that the corresponding viseme is seen. The result may be a simulation of a talking face that makes vocal gestures timed with speech sounds. One possible implementation for this embodiment would be for the animation of facial features within, for example, a toy action figure.

Figure 5:
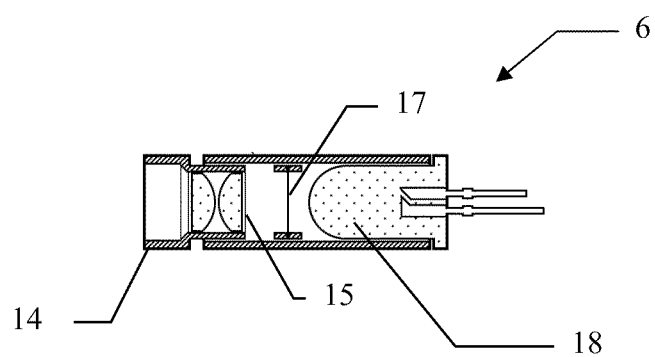
FIG. 5 depicts a cutaway view of an individual projector according to an embodiment of the present invention.

A cutaway view of an individual light source output 6 is shown in FIG. 5. The light source 18 may be an LED, incandescent light bulb, or other source. A slide transparency (reticle) 17 may contain a graphic image that may show one phase of an animation. Lens holder 14 holds lens 15 in alignment.

FIG. 6 represents an isometric drawing showing seven light output sources 6 grouped together into one integrated projection system 20. A different number of light output sources 6 may alternatively be used an integrated projection system.

FIG. 7 shows a view demonstrating the alignment of the plurality of light output sources 6 (shown as 6a, 6b, and 6c) in the integrated projection system 20. By positioning the outer light output sources (such as 6a and 6c in the demonstrated embodiment) at angles, the light paths, shown as 26a, 26b, and 26c, can each be projected towards the same area on the projected surface medium 24. The alignment positioning directly correlates to the intended distance of the medium 24 from the integrated projection system 20. The medium 24 may be a screen or wall, or any number of surfaces including, for example, smoke, ice, water, etc.

FIG. 8 depicts an exemplary slide transparency 17 for a single image as may be used in individual light source output 6.

FIG. 9 presents an first alternative embodiment of an integrated projection system, depicted generally as 32, containing individual light source outputs 31a, 31b, and 31c. This first alternative embodiment uses angled prisms 34a to guide the light paths, depicted as 35a, 35b, and 35c, of the outer light source outputs 31a and 31c, so that all light paths 35a, 35b, and 35c are projected onto the same location on medium 24. Alternatively, as shown in FIG. 10 an integrated prism 37 may be used that directs the light paths for each individual light source output towards the same location on the medium 24.

FIG. 11 depicts an embodiment showing an integrated transparency holder 40 that holds an integrated common slide 41 (depicted in FIGS. 12b, 12d, 13a, 13b). The integrated common slide is a single slide that contains a plurality of images that each represent individual frames for an animation. By utilizing the integrated transparency holder, it may be possible to substitute all images for an animation out at one time. Additionally, there is no need to individually assemble slides within the individual light sources.

Figure 12A:
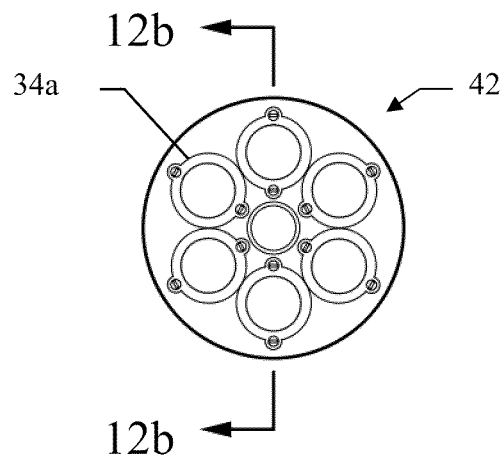
FIG. 12a depicts a top view of an embodiment of the present invention showing an integrated projection system containing individual prisms.
Figure 12B:
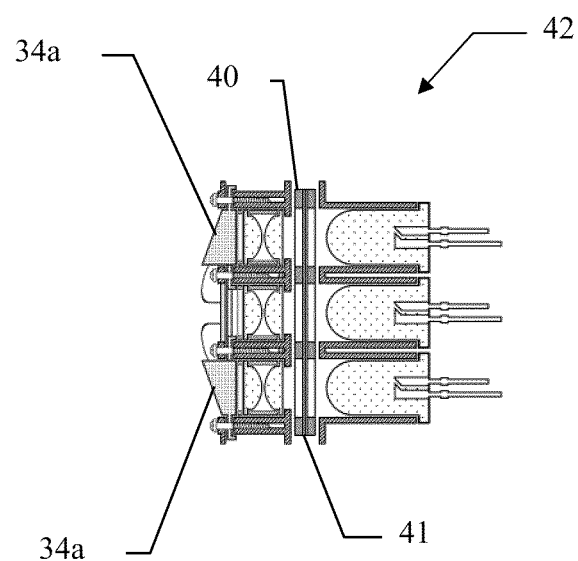

Shown in FIGS. 12a and 12b are a top view and cross section of an embodiment of a parallel integrated projection system 42 utilizing an integrated transparency holder 40 that holds an integrated common slide 41. Light sources are arranged adjacent to individual images on the integrated common slide. The system may use angled prisms 34a or, as shown in FIGS. 12c and 12d, an integrated prism 37 to align the light paths to the same focal area.

Figure 13A:
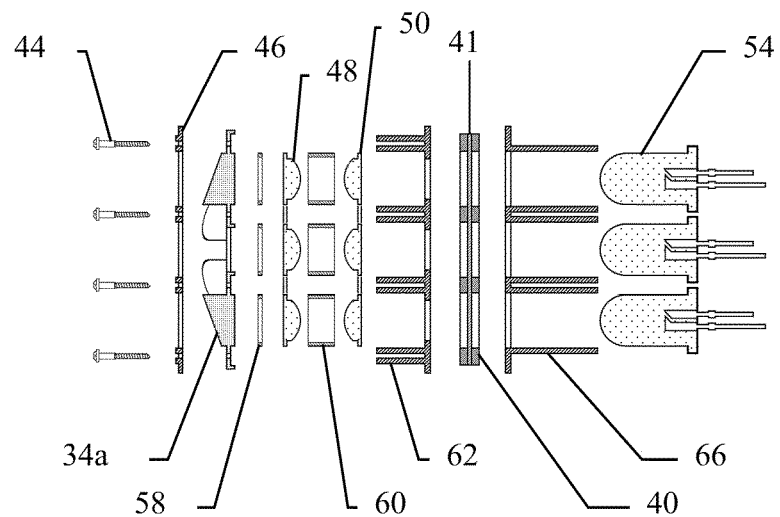
FIG. 13a depicts an exploded view of the integrated projection system shown in FIG. 12a and FIG. 12b.
Figure 13B:
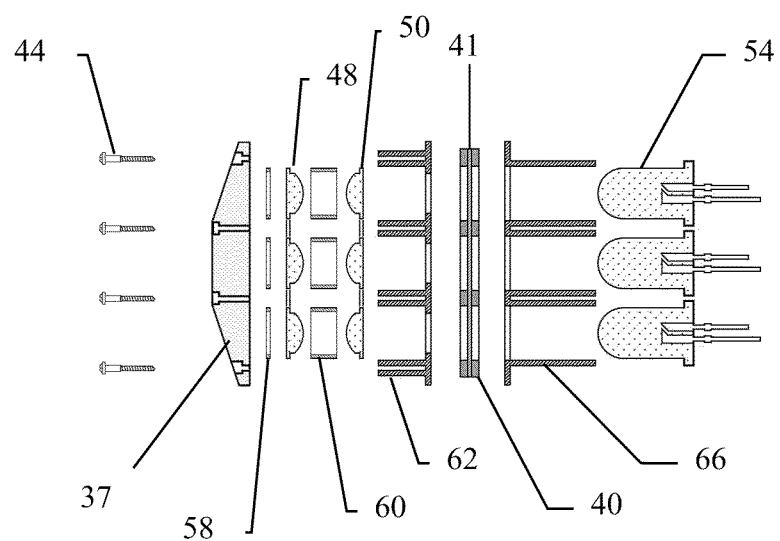
FIG. 13b depicts an exploded view of the integrated projection system shown in FIG. 12c and FIG. 12d.

FIG. 13a represents an exploded cross-section view of the embodiment shown in FIG. 12b. Screws 44, attach retaining bracket 46 to the angled prisms 34a and to the lens housing 62. Optic spacer 58 maintains the proper spacing of the angled prisms 34a. Integrated lens 48, 50 sit within lens holder 60. Light sources 54, which may be LEDs, may sit within the light source housing 66. The integrated transparency holder 40 that holds an integrated common slide sit within the structure. FIG. 13b represents an exploded cross-section view of the embodiment shown in FIG. 12d, containing an integrated prism 37.

Figure 14:
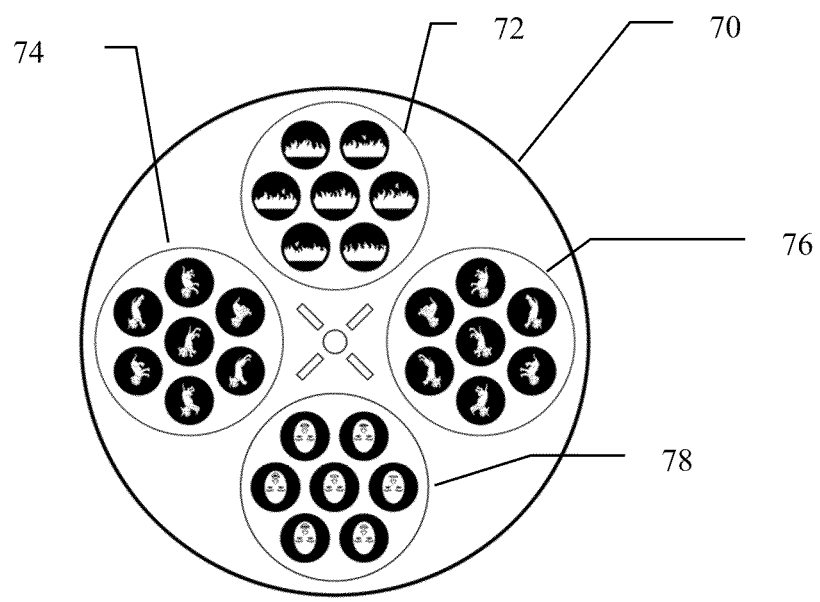
FIG. 14 depicts an embodiment of the present invention showing several flat integrated transparency holders aligned in a master slide transparency wheel.

FIGS. 14, 15, and 16 depict a second alternative embodiment that utilizes a master slide transparency wheel 70. The wheel 70 may contain multiple sets of animations, such as those depicted as 72, 74, 76, and 78. The parallel integrated projection system 42 is aligned with one set of animations at a time, however by rotating the wheel 70, a different animation may be displayed. Switching among animations may be implemented manually, mechanically, or electromechanically.

It is to be understood that the embodiments are merely illustrative of the present invention and that many variations of the above-described embodiments can be devised by one skilled in the art without departing from the scope of the invention. It is therefore intended that all such variations be included within the scope of the following claims and their equivalents.

The invention claimed is:

1. A projection system, comprising:
    a plurality of image frames;
    a plurality of projection light sources for projecting individual ones of the plurality of image frames onto a medium, the plurality of projection light sources being in alignment with the plurality of image frames;
    optics for directing the projected image frames onto a focal area of the medium; and
    a switching device for enabling the plurality of projection light sources in a sequence,
    wherein the projected image frames are displayed at the focal area on the medium in accordance with the sequence; and
    an integrated prism containing the optics.

2. A projection system, comprising:
    a plurality of image frames;
    a plurality of projection light sources for projecting individual ones of the plurality of image frames onto a medium, the plurality of projection light sources being in alignment with the plurality of image frames;
    optics for directing the projected image frames onto a focal area of the medium; and
    a switching device for enabling the plurality of projection light sources in a sequence,
    wherein the projected image frames are displayed at the focal area on the medium in accordance with the sequence; and
    a master slide transparency wheel comprising a first set of image frames and a second set of image frames,
    wherein rotation of the master slide transparency wheel results in a change of alignment of the plurality of projection light sources from the first set of image frames to the second set of image frames.

3. A projection system comprising:
    a plurality of image frames;
    a plurality of projection light sources for projecting one or more of the plurality of image frames onto a medium;
    optics for directing the projected image frames onto the medium;
    an integrated prism containing the optics; and
    a switching device for enabling the plurality of projection light sources in a sequence, wherein the projected image frames are displayed on the medium in accordance with the sequence.

4. A projection system according to claim 3, wherein each of the plurality of projection light sources comprises an LED.

* * * * *